United States Patent [19]

Cho

[11] Patent Number: 5,760,848
[45] Date of Patent: Jun. 2, 1998

[54] VIDEO MONITOR APPARATUS HAVING DISPLAY MODULE CAPABLE OF BEING USED AS A PORTABLE TELEVISION RECEIVER

[76] Inventor: Myeong-Eon Cho, 15-903, Shindonga Apt., 241-21, Seobinggo-Dong, Yongsan-Ku, Seoul, Rep. of Korea

[21] Appl. No.: 309,616

[22] Filed: Sep. 21, 1994

Related U.S. Application Data

[63] Continuation of Ser. No. 973,782, Nov. 9, 1992, abandoned.

[30] Foreign Application Priority Data

Mar. 23, 1992 [KR] Rep. of Korea ............... 1992-4778

[51] Int. Cl.⁶ ............................................. H04N 5/64
[52] U.S. Cl. ............................................... 348/839
[58] Field of Search ......................... 358/254, 93, 181, 358/188, 85, 108, 103; 455/347, 348, 349; 348/836, 837, 838, 839, 842, 705, 706; H04N 5/44, 5/46, 5/64

[56] References Cited

U.S. PATENT DOCUMENTS

| | | | |
|---|---|---|---|
| 3,816,662 | 6/1974 | Shaver et al. | 358/85 |
| 4,051,526 | 9/1977 | Steinkopf et al. | 358/181 |
| 4,151,557 | 4/1979 | Iida et al. | 358/181 |
| 4,232,196 | 11/1980 | Filippi | 358/108 |
| 4,277,804 | 7/1981 | Robison | 358/108 |
| 4,361,854 | 11/1982 | Wolfe | 358/181 |
| 4,370,675 | 1/1983 | Cohn | 358/108 |
| 4,581,646 | 4/1986 | Kubodera | 358/181 |
| 4,660,085 | 4/1987 | Harwood et al. | 358/181 |
| 4,766,491 | 8/1988 | Saitoh et al. | 358/108 |
| 4,769,764 | 9/1988 | Levanon | 364/708 |
| 4,845,634 | 7/1989 | Vitek et al. | 364/468 |
| 4,969,046 | 11/1990 | Sugimoto et al. | 358/254 |
| 5,111,288 | 5/1992 | Blackshear | 358/108 |
| 5,175,671 | 12/1992 | Sasaki | 361/392 |
| 5,249,164 | 9/1993 | Koz | 358/903 |
| 5,375,604 | 12/1994 | Kelley et al. | 128/671 |

FOREIGN PATENT DOCUMENTS

| | | |
|---|---|---|
| 60-120683 | 6/1985 | Japan . |
| 61-88670 | 5/1986 | Japan ............... H04N 5/44 |
| 63-274286 | 11/1988 | Japan . |
| 63-283292 | 11/1988 | Japan . |
| 1147983 | 6/1989 | Japan . |
| 1158887 | 6/1989 | Japan . |
| 2134784 | 11/1990 | Japan . |
| 1155807 | 6/1969 | United Kingdom ............. H04N 7/00 |

OTHER PUBLICATIONS

*Sync* Catalog, Spring 1989 (month not avail.).

*Primary Examiner*—Bryan Tung
*Attorney, Agent, or Firm*—Leydig, Voit & Mayer, Ltd.

[57] ABSTRACT

A video monitor apparatus is capable of being used as a portable television screen, in which an image is picked up by an image pick-up device in response to an operating command signal, and the picked-up video signal is displayed on a display unit. The apparatus includes a portable television receiver for displaying a video signal supplied from the video camera through an apparatus body in monitor mode, and for receiving television broadcasts in a television signal reception mode wherein the display unit is detachable from the apparatus body. In addition, to use with a portable television receiver, the video monitor apparatus is adaptable for use with a video door-phone, a video camera, a video telephone or a rear monitor apparatus for an automobile.

14 Claims, 4 Drawing Sheets

5,760,848

1

VIDEO MONITOR APPARATUS HAVING DISPLAY MODULE CAPABLE OF BEING USED AS A PORTABLE TELEVISION RECEIVER

This application is a continuation of application Ser. No. 07/973,782, filed Nov. 9, 1992, now abandoned.

BACKGROUND OF THE INVENTION

The present invention relates to a video monitor apparatus, and more particularly a video monitor apparatus capable of being used as a signal display screen.

Referring to FIG. 1, at least one video monitor apparatus is in almost every home. For example, a television receiver 1, a portable television 2, a personal computer (not shown), a video door-phone 3, a video telephone 4 and a video camera 5, etc are frequently found in homes. Also, a rear monitor apparatus 6 can be installed in automobiles.

Technologies relating to video door-phones are disclosed in Japanese utility model laid-open publication No. Hei 2-13784 and Japanese patent laid-open publication No. Hei 1-158887. Rear monitor apparatuses for use in automobiles are addressed in Japanese patent laid-open No. Hei 1-147983 and Sho 63-274286. Also, conventional video cameras and video telephones utilize image sensors for video display, such as charge-coupled devices (CCD) or liquid crystal display (LCD) panels.

Portable televisions, video door-phones, video cameras and the video telephones commonly use miniature LCD panels for video display. However, since each of the foregoing products has an LCD, the average household is equipped with several video display devices. Accordingly, portable televisions are mainly used outdoors, while large-screened televisions are used in the home. Further, video door-phones and video telephones are not used while the user is away from his residence. The automobile's rear monitor apparatus is used solely in connection with the operation of the automobile. Also, the video display device attached to the video camera is used only when the video camera is in the record or playback mode and cannot be utilized in any of the above cases.

Therefore, since respective video display devices (attached to respective products) are used on an as-needed basis, there are substantial amounts of time in which the video display devices of the aforementioned products are idle.

SUMMARY OF THE INVENTION

Therefore, to solve the above problems, it is an object of the present invention to provide a video monitor apparatus capable of being used as a display device for video signals.

To accomplish the above object of the present invention, there is provided a video monitor apparatus which operates in a video monitor mode and in a video signal reception mode. When in the monitor mode, the video monitor apparatus displays images transmitted from a video camera which is connected to the video apparatus by cables or wires. When in the video signal mode, the video monitor apparatus displays images generated from video signal inputs such as television signals.

In accordance with the present invention, the video monitor apparatus comprises a video monitor apparatus, a portable television receiver, an image pick up means, a switch for generating an operating command signal, a plurality of mode selection devices for generating mode selection signals including a television mode signal and a monitor mode signal, a base for said portable television receiver, said base comprising a first connection terminal connected to said image pick up means which supplies power and receives a video signal from said image pick up means and a second connection terminal connected to said switch for receiving the operating command signal, a plurality of connection terminals engaged with said portable television receiver for transmitting the video signal, the mode selection signals and power supplied by the first connection terminal to said portable television, said portable television displaying an image generated from a received television signal responsive to the television signal reception mode signal and displaying an image generated from said image pick up means responsive to the monitor mode signal.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Hereinafter, one embodiment of the present invention will be described in more detail with reference to the attached drawings.

Figure 1:
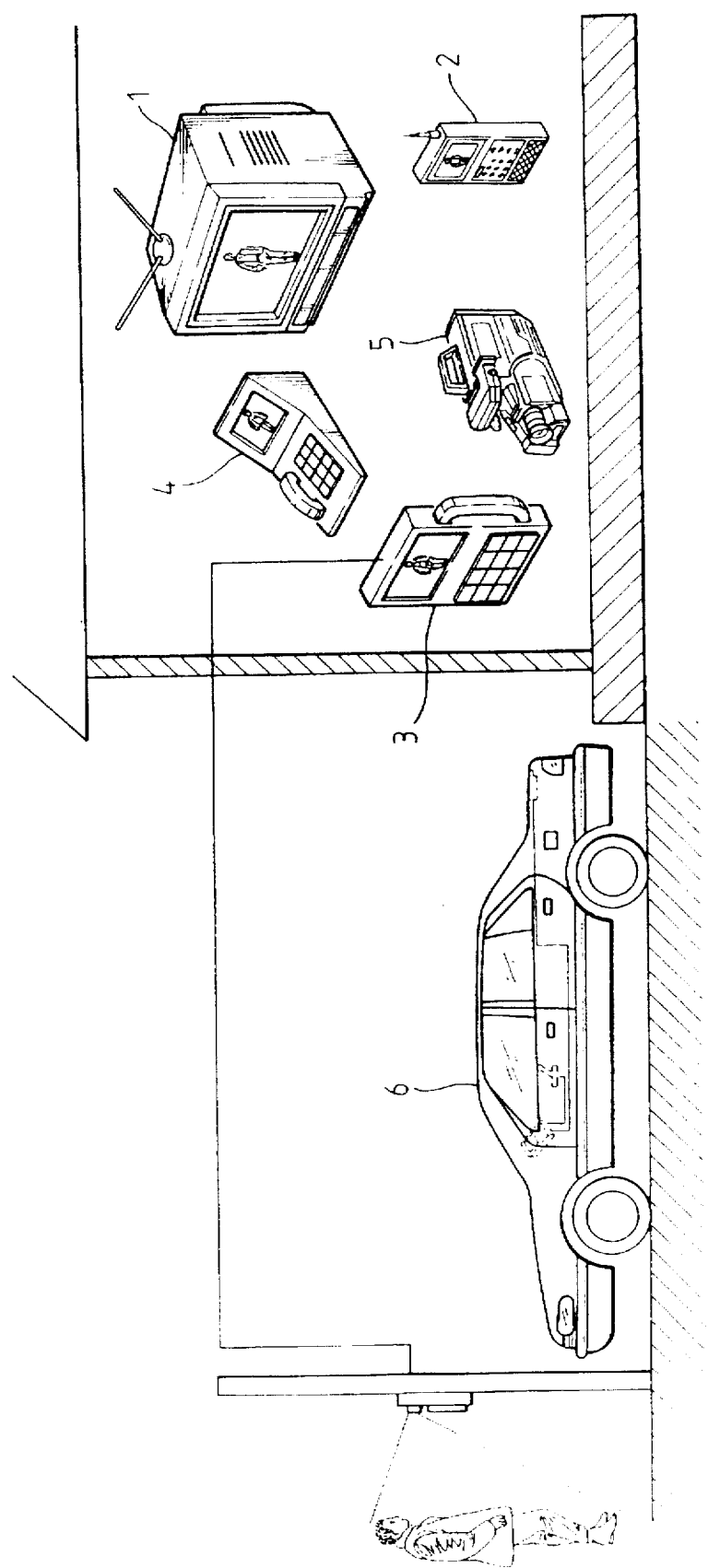
FIG. 1 illustrates various video monitor apparatuses.
Figure 2:
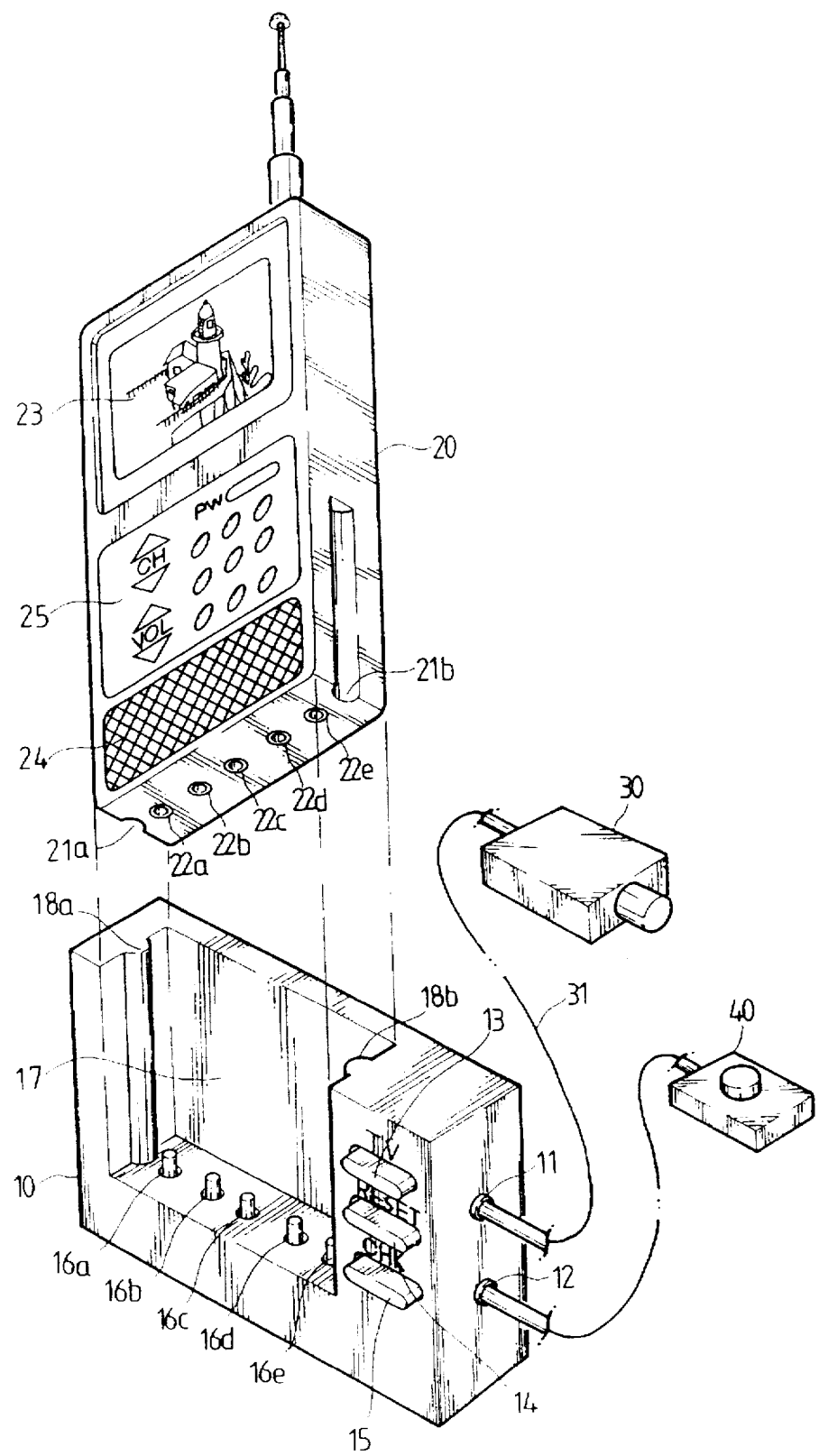
FIG. 2 is a perspective view of a video monitor apparatus capable of being used as a portable television according to the present invention.

FIG. 2 is a perspective view of a video monitor apparatus capable of being used as a portable television according to the present invention. In FIG. 2, reference numeral 10 designates an apparatus body, 20 is a portable television receiver, 30 is an image pick-up means of a video camera, and 40 is an operating command switch. The image pick-up means preferably comprises a conventional charge-coupled device or CCD. Apparatus body 10 comprises a connector 11 for connection with image pick-up means 30 via cable 31, a connector 12 for receiving an operating command signal from operating command switch 40, mode selecting switches 13, 14 and 15, connect pins 16a through 16e for electrical connection with the portable television receiver 20, and a linkage portion 17 for housing the portable television receiver 20. On the bottom of linkage portion 17, connect pins 16a through 16e are formed as protruding structures, and on either side of linkage portion 17, guide protrusions 18a and 18b are respectively formed. The sides of the lower end of portable television receiver 20 each have guide slots 21a and 21b (corresponding to guide protrusions 18a and 18b), respectively, formed thereon. Contacts 22a through 22e are formed on the bottom of the portable television receiver 20, to respectively contact connect pins 16a through 16e of body 10. Also included in portable television receiver 20 are an LCD panel 23, a speaker 24, and an operating key panel 25 on which operating buttons are installed.

OPERATION IN THE TELEVISION SIGNAL RECEPTION MODE

Figure 3:
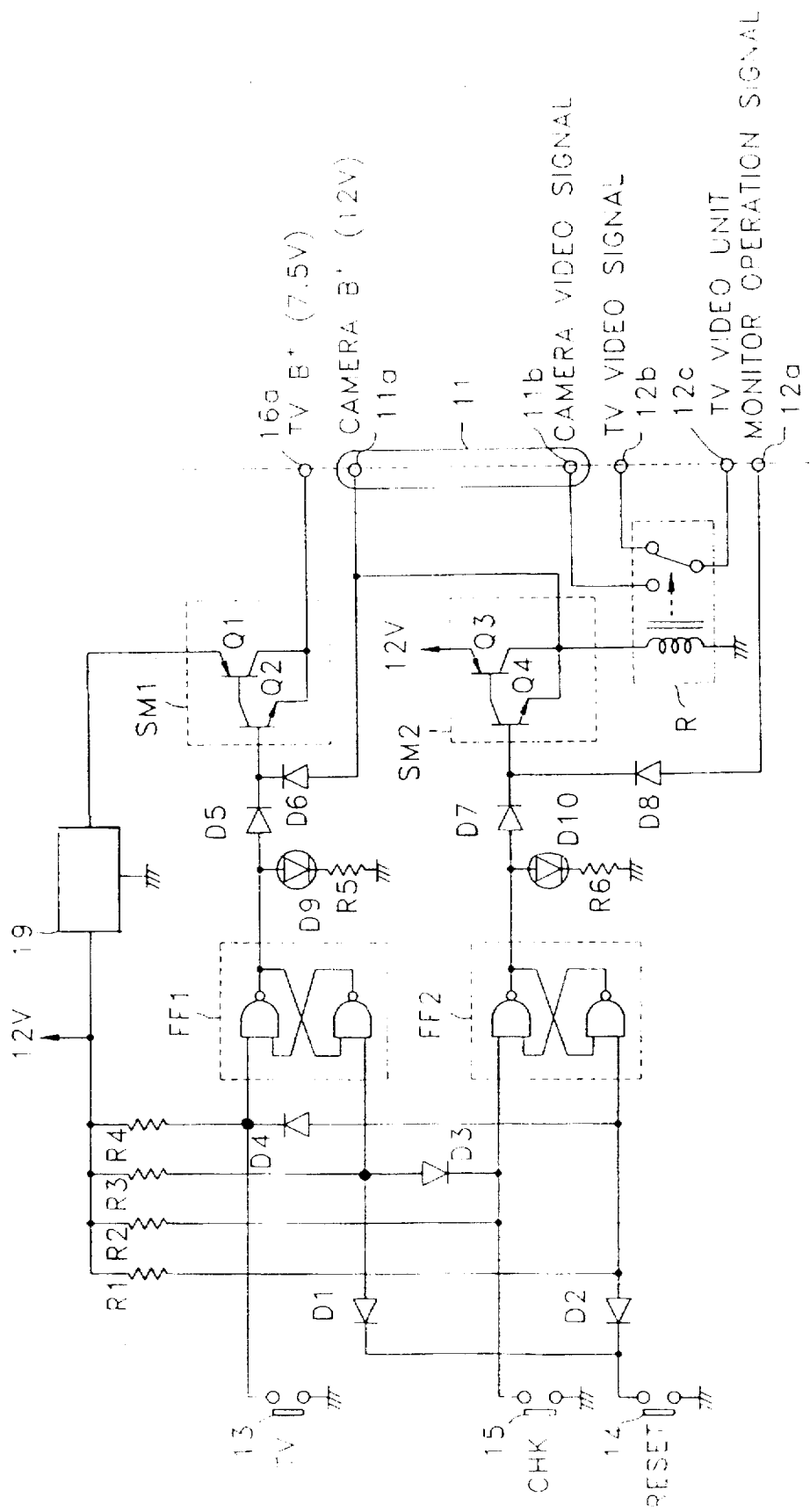
FIG. 3 is a circuit diagram of a circuit installed in a video monitor apparatus capable of being used as a portable television according to one embodiment of the present invention.

FIG. 3 is a circuit diagram of a circuit installed in apparatus body 10. In this circuit, when mode selecting pin switch 13 for setting the apparatus to a television signal reception mode is tripped, flip-flop FF1 is set. Accordingly, the output of a flip-flop FF1 goes high, thus turning on a light-emitting diode (LED) D9 to display that the apparatus is in a television signal reception mode. Then, through a diode D5, switch means SM1 is turned on to supply the television source voltage (7.5 V) to connect pin 16a. At the same time, a flip-flop FF2 is reset through a diode D4. Accordingly, an LED D10 and switch means SM2 are turned off. As a result, the mode selecting switch 15 of the apparatus is set to the RESET state.

OPERATION IN THE MONITOR MODE

Further in FIG. 3, when mode selecting switch 15 is pressed, flip-flop FF2 is set and flip-flop FF1 is reset via diode D3. Accordingly, the apparatus operates in the monitor mode (opposite the television signal reception mode). That is, LED D9 is turned off and LED D10 is turned on, to display that the apparatus is in the monitor mode. Accordingly, switch means SM2 is turned on, so that 12 V is supplied to image pick-up means 30 through power terminal 11a. Then, image pick-up means 30 picks up the image of an object to be viewed, and provides the picked-up image signal to signal terminal 11b. Also, a relay R is driven to switch connect pin 16c between connect pin and signal terminal 16b and respectively. Accordingly, the above selected image signal is supplied to the video display unit of portable television receiver 20 through connect pin 16c. At this time, since switch means SM1 is turned on through diode D6, the source voltage of 7.5 V is supplied to portable television receiver 20.

OPERATION IN THE RESET MODE

On the other hand, when mode selection button 14 is pressed, both flip-flops FF1 and FF2 are reset via diodes D1 and D2, respectively, so that LEDs 9 and 10 are turned off and switch means SM1 and SM2 are also turned off. Here, reference numeral 19 designates a voltage converter for converting the 12 V source voltage into a television driving voltage of 7.5 V. Of course this conversion, is unnecessary if the voltage for the portable television receiver is to be 12 V. For example, in the case of the rear monitor apparatus in a car, the appropriate television driving voltage is 12 V which is supplied via the cigarette lighter. Also, reference symbols R1 through R6 represent resistors.

In such a construction as described above, when a logic high operating command signal is received via connector 12a in the television signal reception mode or the RESET mode, switch means SM2 is turned on irrespective of the latch states of flip-flops FF1 and FF2 and, subsequently, switch means SM1 is turned on. Accordingly, the apparatus automatically operates in the monitor mode. That is, the monitor mode is set when switch 40 is turned on. Examples of this operation are: 1) in the case of the rear monitor apparatus of the automobile, switch 40 is linked with the car's transmission (reverse); 2) in the case of the video door-phone apparatus, switch 40 is tied to the doorbell button; 3) in the case of the video telephone, switch 40 operates in tandem with the on/off operation of a hook switch; and 4) in the case of the video camera apparatus, switch 40 is activated by the power switch.

Figure 4:
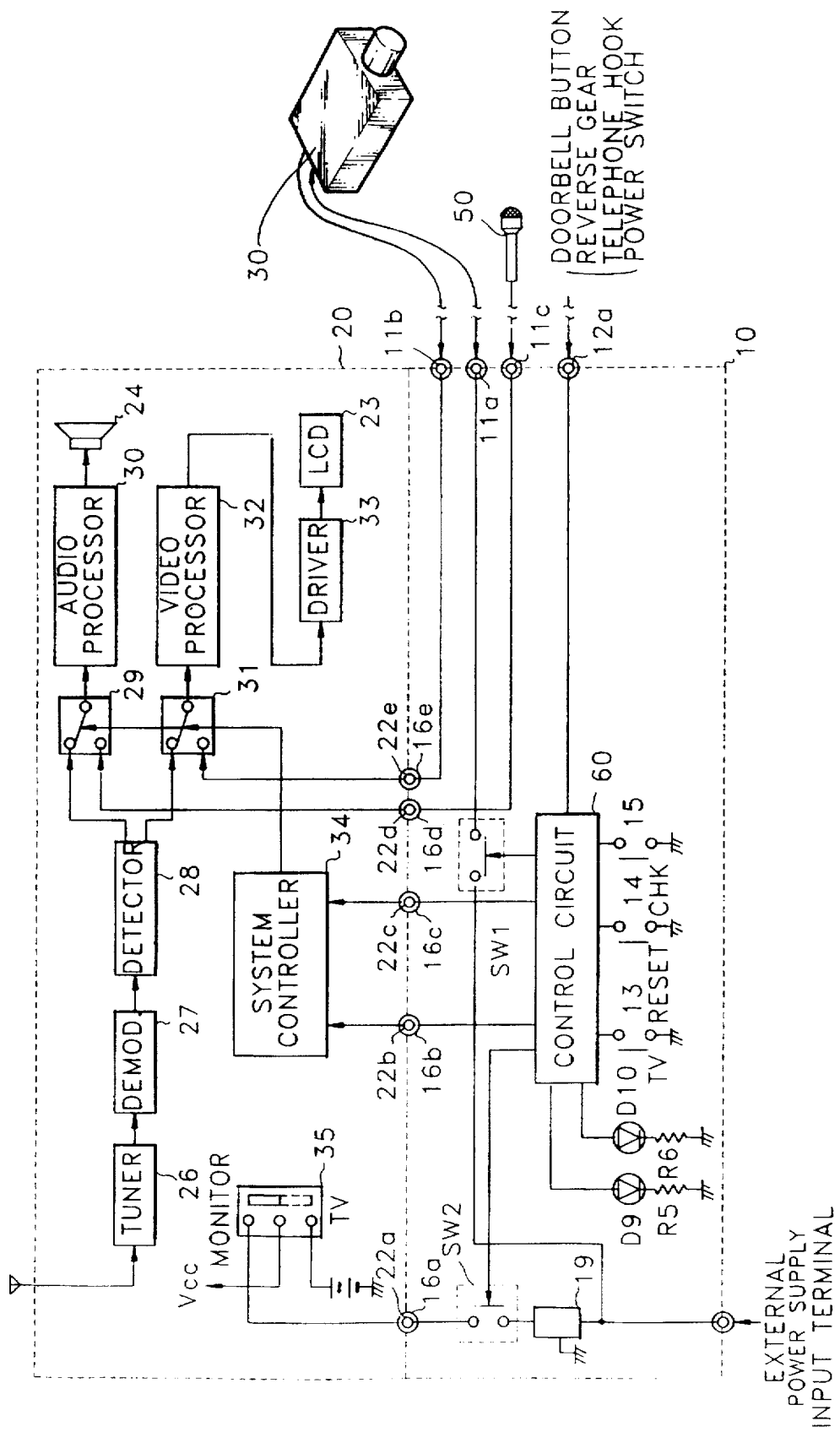
FIG. 4 is a circuit diagram of a circuit installed in a video monitor apparatus capable of being used a portable television according to another embodiment of the present invention.

FIG. 4 is a diagram of another embodiment according to the present invention. Like reference numerals are used to designate common elements in FIGS. 2, 3, and 4. The apparatus shown in FIG. 4 can be adapted to either the video door-phone or the video telephone but is described below in connection with the portable television receiver 20.

In this embodiment, in addition to the video signal, an audio signal can be heard via speaker 24 of the portable television receiver 20. A visitor's voice is received by microphone 50 which is connected to apparatus body 10 via connector 11c. An audio signal representative of the visitor's voice is transmitted to the portable television receiver 20 through connection terminals 16d and 22d.

In operation, a control circuit 60 receives switching signals supplied from mode selecting switches 13, 14 and 15, and operation command signals supplied via connection terminal 12a, so as to drive LEDs 9 and 10 and control switches SW1 and SW2. Accordingly, voltages supplied to the portable television receiver 20 and the image pick-up means 30 are controlled. Also, control circuit 60 supplies the mode selection signal to the portable television receiver 20 through connect pins 16b and 16c.

The portable television receiver 20 comprises a tuner 26 for tuning a television broadcasting signal received via an antenna. A demodulator 27 is connected to the output of the tuner 26 for demodulating the tuned television signal. A detector 28 is connected to the output of the demodulator 27 for detecting video signals and audio signals from the demodulated signal. The detector output carrying the audio signal is connected to a first switching means 29 which selects either the detected audio signals or the audio signal supplied via contact 22d. An audio processor 50 is provided for processing the selected audio signal and transmitting the processed signal to speaker 24.

The detector output carrying the video signal is connected to a second switching means 31 which selects either the detected video signal or the video signal supplied via contact 22e. A video processor 32 is included for processing the selected video signal and an LCD driver 33 drives LCD display device 23 according to the processed video signal.

A power supply selection switch 35 is provided for selecting either a battery or an external power source to supply power to the system. The battery voltage is selected when the apparatus is used as a portable unit, and the supply voltage is selected via contact 22a when the apparatus is used as a monitor.

Operation of the portable television receiver 20 is controlled by a system controller 34. Specifically, the system controller 34 receives the mode selection signal supplied from body 10 via contacts 22b and 22c. The system controller 34 then generates a control signal responsive to the mode selection signal which controls the first and second switching means 29 and 31 and sets the portable television receiver 20 to the monitor mode. Thus, if a visitor presses a doorbell button 40 when the portable television receiver 20 is connected to the body 10, control circuit 60 turns on switches SW1 and SW2. Accordingly, supply voltages are respectively supplied to the television receiver 20 and the image pick-up means 30. Therefore, the visitor's image is picked-up by the image pick-up means 30, supplied to the portable television receiver 20 via the body 10, and displayed on the LCD panel 23 of the portable television receiver 20. Concurrently, the visitor's voice is picked up via the microphone 50, and supplied to the television receiver 20 via the body 10, so as to be broadcast through the speaker 24.

As described above, in the video monitor apparatus according to the present invention, the portable television receiver 20 is connected with the body 10 so as to be used as a video monitor in the monitor mode. During outings, while on vacation, etc., the portable television receiver 20 is separated from the body 10, and then connected to an automobile. Accordingly, television broadcasts can be received. In this case, the portable television receiver 20 can also be used as the above-mentioned rear monitor. Also, upon exiting the automobile, the user can separate the device so as to carry the portable television receiver 20, thereby enabling the user to view television broadcasts after reaching his or her destination.

It should be noted that when the video monitor apparatus according to the present invention is adapted to be used with other display devices such as a video door-phone, a video camera, a video telephone or an automobile rear monitoring apparatus, the apparatus body 10 of the portable television receiver 20 is replaced by an apparatus body corresponding to one of the foregoing display devices. Accordingly, in addition to serving as a portable television receiver, the video monitor apparatus can be used for a variety of auxiliary purposes. Thus, the present invention is very economic.

While the invention has been particularly shown and described with reference to preferred embodiments thereof, it will be understood by those skilled in the art that various changes in form and details may be made without departing from the spirit and scope of the invention as defined by the appended claims.

What is claimed is:

1. A video display apparatus comprising:
    a base having a linkage portion, first and second selector switches and a plurality of connectors formed in the linkage portion;
    a unitary self-contained portable television unit detachably disposed in the linkage portion and electrically coupled with the plurality of connectors;
    an image pick-up means for capturing an image and generating an image signal representative of the captured image, said image pick-up means being coupled to said base through a signal terminal;
    a control circuit disposed within said base and coupled with said plurality of connectors, said control circuit including:
        means for receiving and applying a television source voltage to a first one of the plurality of connectors responsive to activation of the first selector switch, means for receiving and applying voltage to said image pick-up means responsive to activation of the second selector switch, a relay coupled with said image pick-up means and said portable television unit and driven responsive to said means for receiving and applying voltage to said image pick-up means to selectively electrically connect the signal terminal to said portable television unit.

2. A video display apparatus as claimed in claim 1 wherein said means for receiving and applying a television source voltage includes a logic device, a switch and means for connecting the logic device to the switch.

3. A video display apparatus as claimed in claim 2 wherein the logic device includes a flip-flop.

4. A video display apparatus as claimed in claim 3 wherein the means for connecting the logic device to the switch includes a diode.

5. A video display apparatus as claimed in claim 1 further comprising means for applying an operating command signal to said control circuit where said means for receiving and applying voltage to said image pick-up means is responsive to the operating command signal.

6. A video display apparatus as claimed in claim 5 wherein said means for receiving and applying a television source voltage to and from said image pick-up means includes a logic device, a switch and means for connecting the logic device to the switch.

7. A video display apparatus as claimed in claim 6 wherein the logic device includes a flip-flop.

8. A video display apparatus as claimed in claim 7 wherein the means for connecting the logic device to the switch includes a diode.

9. A video display apparatus as claimed in claim 6 wherein said means for applying the operating command signal includes a video telephone.

10. A video display apparatus as claimed in claim 6 wherein said means for applying the operating command signal includes a door bell.

11. A video display apparatus as claimed in claim 6 wherein said means for applying the operating command signal includes a reverse gear detection switch of a transmission.

12. A video display apparatus as claimed in claim 5 wherein said portable television unit includes:
    means for receiving a television broadcast signal and for generating video signals and audio signals from the television broadcast signal;
    an audio processor;
    an audio switch having a first input connected to said means for receiving television signals and a second input connected to a second one of the plurality of connectors and an output connected said audio processor;
    a video processor;
    a video switch having a first input connected to said means for receiving television signals and a second input connected to a third one of the plurality of connectors and having an output connected to said video processor;
    a system controller for operating the audio and video switches responsive to an output of the relay of the control circuit.

13. A video display apparatus as claimed in claim 12 wherein the system controller selectively connects the first and second inputs of the audio switch to the output of the audio switch responsive to the output of the relay of the control circuit.

14. A video display apparatus as claimed in claim 12 wherein the system controller selectively connects the first and second inputs of the video switch to the output of the video switch responsive to the output of the relay of the control circuit.

* * * * *